(12) United States Patent
Kreschel (10) Patent No.: US 11,738,399 B2
(45) Date of Patent: Aug. 29, 2023

(54) METHOD FOR MACHINING A TOOTHING AND TOOTHING MACHINE DESIGNED FOR SAME, AS WELL AS COMPUTER PROGRAM PRODUCT FOR SAME

(71) Applicant: GLEASON-PFAUTER MASCHINENFABRIK GMBH, Ludwigsburg (DE)

(72) Inventor: Jürgen Kreschel, Hemmingen (DE)

(73) Assignee: GLEASON-PFAUTER MASCHINENFABRIK GMBH, Ludwigsburg (DE)

(*) Notice: Subject to any disclaimer, the term of this patent is extended or adjusted under 35 U.S.C. 154(b) by 600 days.

(21) Appl. No.: 16/613,453

(22) PCT Filed: Jun. 20, 2018

(86) PCT No.: PCT/EP2018/066346
§ 371 (c)(1),
(2) Date: Nov. 14, 2019

(87) PCT Pub. No.: WO2019/011602
PCT Pub. Date: Jan. 17, 2019

(65) Prior Publication Data
US 2021/0162527 A1  Jun. 3, 2021

(30) Foreign Application Priority Data
Jul. 11, 2017 (DE) .......................... 102017006553.5

(51) Int. Cl.
*B23F 5/16* (2006.01)
*B23Q 15/00* (2006.01)

(52) U.S. Cl.
CPC .............. *B23F 5/163* (2013.01); *B23Q 15/00* (2013.01); *Y10T 409/10795* (2015.01); *Y10T 409/105565* (2015.01)

(58) Field of Classification Search
CPC ...... B23F 19/007; B23F 19/06; B23F 19/102; B23F 5/163; Y10T 409/105724;
(Continued)

(56) References Cited

U.S. PATENT DOCUMENTS 2,864,282 A * 12/1958 Daniel .................. B23F 19/007
409/32
4,545,708 A * 10/1985 Buschhoff ............. B23F 23/006
409/32

(Continued)

FOREIGN PATENT DOCUMENTS

DE    102008037514 A1    5/2010
DE    102014201110 A1    8/2014
(Continued)

OTHER PUBLICATIONS

Machine Translation of JP 2012-171020 A, which JP '020 was published Sep. 2012.*

(Continued)

*Primary Examiner* — Erica E Cadugan
(74) *Attorney, Agent, or Firm* — Robert L. McDowell (57) ABSTRACT

The invention relates to a method for machining a toothing (2) having an axis of rotation (C), in which a machining tool (4), which is rotationally driven about its axis of rotation (B), removes material from the toothing while executing a relative motion between the machining tool and toothing to generate a flank geometry of the toothing, which has been predefined over the full width of the toothing, in a machining operation, wherein the predefined flank geometry matches a motion control that defines a motion path of the tool center with respect to the toothing axis of rotation, said motion control having a defined, non-vanishing axial advancement with a defined advancing motion between machining tool and toothing, wherein in a first machining process, the relative motion is only executed for generating a part, more (Continued)

particularly a significant part (5), of the flank geometry according to this motion control, while a further part, more particularly the remaining part (6), of the flank geometry is generated in a second machining process, in which the distance between the tool center and the toothing axis of rotation with respect to the fixed motion path changes in a manner wherein the tool center moves away from the toothing, and in which the change to the machining operation caused thereby is counteracted by an additionally executed change in motion of the relative motion with respect to the motion control of the first machining process.

9 Claims, 6 Drawing Sheets

(58) Field of Classification Search
CPC . Y10T 409/105088; Y10T 409/104929; Y10T 409/105565; Y10T 409/105247; Y10T 409/107632; Y10T 409/10–109699
USPC .................................................... 409/1–62
See application file for complete search history.

(56) References Cited

U.S. PATENT DOCUMENTS

| | | | | |
|---|---|---|---|---|
| 5,052,867 A | * | 10/1991 | Kramer | B23F 5/16 409/59 |
| 2011/0268523 A1 | | 11/2011 | Heinemann et al. | |
| 2011/0268524 A1 | * | 11/2011 | Prock | B23F 5/163 407/1 |
| 2014/0234043 A1 | | 8/2014 | Seiki | |
| 2016/0158860 A1 | | 6/2016 | Prock et al. | |
| 2016/0175955 A1 | * | 6/2016 | Ferry | B23F 23/1225 700/110 |
| 2017/0072485 A1 | * | 3/2017 | Weppelmann | B23F 5/163 |
| 2018/0117691 A1 | | 5/2018 | Buchholz et al. | |
| 2021/0053130 A1 | * | 2/2021 | Zhang | B23F 5/163 |

FOREIGN PATENT DOCUMENTS

| | | | |
|---|---|---|---|
| DE | 102013109981 A1 | | 1/2015 |
| DE | 102015104500 A1 | | 9/2016 |
| EP | 2596893 A1 | | 5/2013 |
| JP | 01-159126 A | * | 6/1989 |
| JP | 2012-171020 A | * | 9/2012 |
| WO | 2013/076030 A1 | | 5/2013 |

OTHER PUBLICATIONS

Machine Translation of JP 01-159126 A, which JP '126 was published Jun. 1989.*
International Search Report and Written Opinion for PCT/EP2018/066346, ISA/EPO, dated Oct. 8, 2018, 12 pgs.
German Patent Office Search Report for DE 102017006553.5, dated Jun. 21, 2018, 12 pgs.
Stadtfeld, Hermann J, "The Basics of Gear Theory", Gear Technology, Jun. 2015, p. 40-46 (at 42).

* cited by examiner

METHOD FOR MACHINING A TOOTHING AND TOOTHING MACHINE DESIGNED FOR SAME, AS WELL AS COMPUTER PROGRAM PRODUCT FOR SAME

The invention relates to a method for machining a toothing having an axis of rotation, in which a machining tool driven in rotation about its axis of rotation removes material from the toothing, in a machining engagement, while performing a relative movement between the machining tool and the toothing in order to produce a flank geometry of the toothing that is predefined over the full width of the toothing, the predefined flank geometry matching a movement control that defines a movement path of the tool center with respect to the axis of rotation of the toothing, said control having defined, non-vanishing axial feeding with defined advancement between the machining tool and the toothing, and the invention also relates to a controlled toothing machine for carrying out this method.

Methods of this kind are known in a variety of different method configurations; reference will be made in the following to skiving, for example.

In skiving, a skiving wheel removes material from a toothing blank in a rolling machining engagement and produces a toothing having a predefined flank geometry, usually in several passes, with the toothing and the tool performing an axial feed movement in each pass until all flank regions have been machined. After the last pass, a desired (final) geometry for the (skiving) machining is achieved. Compared to the final geometry of the later, finished workpiece, this usually still has an oversize to allow for the correct final geometry despite hardening distortions following the usually subsequent hard/fine machining. The last pass of the skiving wheel is often performed as a finishing cut to produce the smoothest possible flank surface.

In the rolling engagement, the kinematic conditions of the skiving wheel with respect to the toothing correspond to those of a helical gearing. This means that the axis of rotation of the skiving wheel is inclined with respect to the axis of rotation of the toothing, in a normal plane to the axial distance axis, by an axis intersection angle, and the cutting speed depends on the axis intersection angle. The choice of axis intersection angle and the tool design are designed on the basis of the geometry of the workpiece to be machined in order to produce the flank geometry of the toothing with the matching movement control on a toothing machine.

The problem addressed by the present invention is that of improving a method of the kind mentioned at the outset in terms of flexible and rapid toothing machining.

This problem is solved in terms of the method by a development of the method which is characterized substantially in that, in a first machining process, the relative movement is carried out only for the production in particular of a predominant portion of the flank geometry according to this movement control, whereas a further portion, in particular the remaining portion of the flank geometry, is produced in a second machining process, in which the distance of the tool center from the axis of rotation of the toothing is changed relative to the fixed movement path so as to move the tool center away from the toothing, and in which the consequent change of the machining engagement is counteracted by a change in movement of the relative movement, which change in movement is additionally carried out relative to the movement control of the first machining process.

The invention is initially based on the knowledge that, due to the set axis intersection angle and the course of the profiling cuts of the skiving wheel on the left and the right tooth flank, which course determines the progression of the tooth flank machining, the skiving wheel projects beyond the axial end of the toothing, towards which end the axial feed direction moves during machining, when viewed in the axial direction of the machined toothing after completion of one pass of work. While in disc-like toothings such an end position of the workpiece with respect to the toothing is less significant, this end position should be taken into account in the manufacture of toothings which, in addition to the toothings themselves, have further structures which are axially arranged from the toothing and which can be considered to be potential interfering contours with respect to the machining of the toothing. If the interfering contours are too close to the toothing itself, skiving would perhaps no longer be considered as a machining method, and the corresponding toothing would then be produced, for example, by generating-shaping. Optionally, however, there is also the possibility of achieving a more favorable positioning of the end position, by setting the lowest possible axis intersection angle, such that there can be no collision at all with the interfering contour.

The invention is further based on the knowledge that the end position of the machining tool with respect to the toothing, after completion of the desired flank geometry of substantially the same toothing depth over the toothing width, is composed of two different components, of which one is from an axial overtravel movement of the tool and is required after machining of one of the left and right flanks has been completed until machining of the other flank has been completed, since the profiling cuts having the flank geometry of the left and right flank are not symmetrical with respect to the normal plane on the toothing axis. The other component is a purely geometric component, which results from the fact that, on account of the axis intersection angle, the envelope of the rotating machining tool, also in the position in which full machining has been finished on both flanks, projects axially further than the normal plane to the toothing axis, in which plane the machining contact is at the end of the overtravel. The movement of the envelope during the relative movement follows the movement path of the tool center.

Using the invention, the component which results from the overtravel can be reduced or even completely avoided by the conventional machining with the axial feeding, and maintained advancement, being carried out not until production of the flank geometry has been completed, but rather only over part of the production of the flank geometry, preferably at least until one of the left and right flanks is machined to the predefined flank geometry. A deviation is made from this first machining process for another portion, in particular the remaining tooth flank portion, whereby the existing movement is not, as is conventional, continued until the usual end position is achieved after going through the overtravel. Rather, the relative movement between the machining tool and the toothing is changed, for example, in such a way that the axial feeding is reduced or even stopped and the tool moves away from the toothing, for example radially. The predefined flank geometry on the other portion, which is not achieved in the first machining process, is nevertheless achieved by carrying out a counteracting and substantially compensating correction movement in the second machining process, which involves, compared with the first machining process, an additionally changed movement of at least one movement axis that is not coincident with the axial feed axis. The tooth flank in the second machining process is thus produced for example by a superimposition movement in the form of an additional rotation about the axis of rotation of the toothing (or the axis of rotation of the tool) (additional movement axis), with the movement over the radial movement axis. The machining tool moves away from the machined toothing, compared with a conventionally maintained constant advancement to the end of the overtravel movement that is usually carried out. Both (first and second) machining processes are part of the same pass.

It is thus possible to produce predefined flank geometries also having a toothing depth that is substantially the same over the toothing width, although the machining tool does not need to perform the conventional overtravel in full, but moves in the critical region on another movement path relative to the toothing, which can be moved past an interfering contour of a workpiece supporting the toothing. At the end at which the movement ceases, the toothing can terminate openly, without the formation of a blind end.

In particular, the machining tool no longer adopts the end position with respect to the toothing, which would otherwise have been achieved in continuation of the first machining process until the overtravel has been passed through. The radial ($[x^2+y^2]^{1/2}$) distance is greater in the end position. The machining process according to the invention is preferably carried out at least in the last (deepest) machining pass (skiving pass).

The invention thus allows, when used for example for skiving, the machining of workpieces having a larger axis intersection angle than is permitted in conventional machining on account of interfering contours, and thus allows for higher cutting speeds and shorter machining times. On the other hand, the invention also allows a more flexible application for example of skiving to a class of workpieces that otherwise would have to be machined only in a generating-shaping process.

The first machining process is preferably carried out in a two-flank process. The second machining process is preferably carried out in a one-flank process, and the transition from the first to the second machining process thus takes place preferably when one of the left and right flanks is finished with respect to the predefined flank geometry.

The tool-side machining engagement region is preferably the same in both machining processes.

In principle, the second machining process being carried out before the first machining process (kinematic reversal of movement) is not excluded. However, the second machining process particularly preferably takes place after the first machining process.

In a particularly preferred embodiment, the movement path of the tool center is changed via the radial (advancement) axis. In this way, the counteracting additional movement can be combined with a radial plunging movement. However, in principle tangential plunging movements are also possible (in particular in the case of external toothings), optionally also in superposition with a radial plunging movement.

In a further particularly preferred embodiment, (one of) the additionally counteracting movement axes (is) are realized by a relative additional rotation of the axis of rotation of the toothing and/or the axis of rotation of the machining. It is particularly easy to implement this additional rotation for compensating for the change in engagement caused by the evasive movement from the second to the first machining process, because, on the machine side, additional rotations with respect to the pure synchronous gear coupling of the axes of rotation can be and are set in any case in order for example to maintain the gear toothing in the case of helical toothings and axial feeding.

Optionally, other movement axis settings may also be changed from the first to the second machining process, such as a tangential axis (orthogonal to the axial distance axis (i.e. radial advancement axis) and with an orthogonal component, or perpendicular to the axis of rotation of the toothing). It is also conceivable for the axis intersection angle or the movement axis to be involved in the compensating change movement in order to be set.

Expediently, the toothing and the machining workpiece are in rolling engagement with one another during the relative movement, in particular such that there is continuous machining. This also ensures short machining times.

In a further particularly preferred embodiment, the axes of rotation of the toothing and the machining tool are arranged at an axis intersection angle that is not zero. This demonstrates that the invention is particularly suitable for methods of which the underlying kinematics are that of the helical gearing, and the method types include skiving, but also the hard machining methods of honing or hard skiving. In this connection, precisely those machining methods are preferred in which the cutting speed depends on the axis intersection angle in the machining processes.

The invention can be used for both soft and hard machining. In preferred applications, the machining tool is a tool having a geometrically determined cutting edge, in particular a skiving wheel. A particularly preferred application of the invention lies in the skiving method. The skiving wheel could be a single tool. However, it is also conceivable for it to be part of a combination or tandem tool which, for example, carries a further skiving wheel coaxially, and by means of which additional machining processes can be performed, such as deburring, chamfering or the incorporation of deposits.

As explained above, in the invention, the axial feeding of the first machining process can be stopped (is not continued) in the second machining process. This is particularly suitable for interfering contours that are significantly radially extended. However, the continuation of the feeding is conceivable, on the one hand to a lesser extent (approximately less than 70%, preferably less than 40%, in particular less than 20% compared to the first machining process), which ultimately results in a corresponding reduction of the overtravel. Depending on the radial extent of an interfering contour, the feed movement could also be brought to an end when viewed in the axial direction if, in addition, the advancement changes sufficiently compared to the advancement in the first machining process. For instance, a change in the relative movement can optionally be brought about solely by changing the radial and/or tangential advancement position, which relative movement can be guided past an interfering contour. Unlike a desired reduction of the toothing depth by carrying out a plunging movement during a maintained axial feeding, the desired flank geometry, in particular having a substantially uniform toothing depth, is still produced in the invention, since it takes place in the second machining process via additional counteracting settings of the machine axes. The term "substantial" means at this point that any minimal changes to the toothing depth by flank modifications, such as crowning, setting the amount of offset, or possibly provided further flank modifications, which are implemented in any case within the machining process, should not be considered. The predefined flank geometry itself is preferably that of an involute toothing, but the invention can also be applied to more complex flank forms.

A method configuration in which the invention provides particular advantages is that in which the toothing is part of a wave-like workpiece having a further structure which has a radial extension at an axial distance from one of the axial toothing ends, which extension extends in particular further than the toothing itself. With a correspondingly large radial extension, the contour could be seen as an interfering contour to be considered as part of a conventional method.

By using the method according to the invention, the distance/safety distance from such an interfering contour can be positively influenced. The machining tool and/or the axis intersection angle is designed/set such that, if the further portion of the flank geometry is produced while maintaining the relative movement of the first machining process, the machining tool would no longer maintain a safety distance from the further structure, and in particular would collide therewith.

In a preferred method configuration, the axis intersection angle of the first and/or second machining process is at least 8°, preferably at least 12°, in particular at least 16°. This makes it possible to achieve appropriate cutting speeds, and workpieces which would otherwise be machinable only with very small axis intersection angles in conventional methods can be produced in less time. However, the invention is expressly not limited to such large axis intersection angles and can also be carried out in the case of smaller axis intersection angles of 5° or more, for example to still be able to produce a workpiece using skiving and to benefit from the advantages that can be achieved according to the invention, without having to resort to slower machining methods such as generating-shaping. Axis intersection angles of 20° or higher are also conceivable.

The method can be applied both to the machining of external toothings and the machining of internal toothings.

In terms of device technology, the invention is protected by correspondingly designed toothing machines and control units, such as a computer program product which, when executed on a toothing machine, controls said machine in line with a method according to any of the preceding aspects.

Furthermore, the invention protects a toothing machine comprising a workpiece holder for rotatably mounting a toothing having an axis of rotation and a tool holder for mounting a machining tool such that it is driven in rotation about its axis of rotation, and comprising machine axes which allow a radial advancing movement between the machining tool and the toothing, an axial feed movement with a movement component parallel to the axis of rotation of the toothing, and the invention also protects a control device which is designed and programmed to carry out a method according to any of the aforementioned aspects on the toothing machine.

Further details, particularities and advantages of the invention can be found in the following description with reference to the accompanying drawings, in which FIG. 1 schematically shows a contact line in a toothing machining process.

Figure 1:
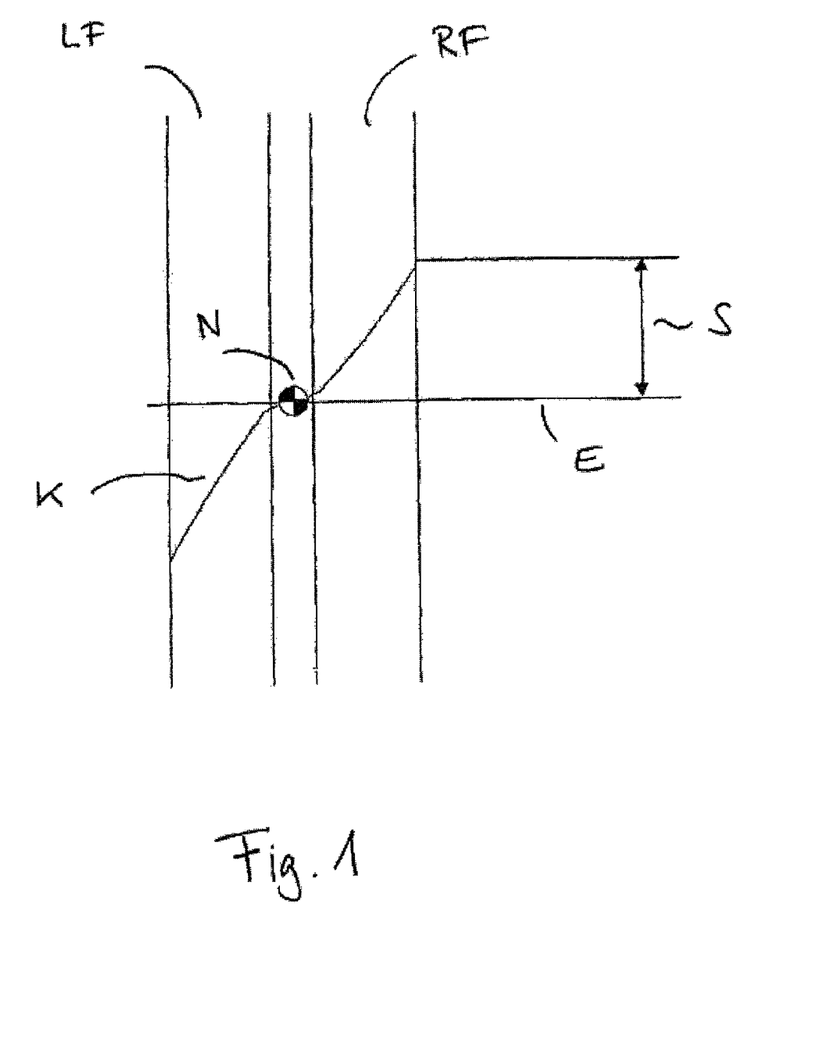

FIG. 1 schematically shows a tooth gap of a toothing, in which LF designates the left and RF designates a right tooth flank, between which the gap base is depicted. The circle contained therein with the two black-filled quadrant sectors symbolizes a zero point N in the tool system, for example the (tool center axis at the level of an) axial position of the tooth tip of a tooth of a skiving wheel toothing. The line designated by K in FIG. 1 is the contact line, as it results in the profile formation of the toothing during power-skiving, and which extends in the radial as well as in the axial length. The contact line corresponds to the contact between the machining tool and the toothing at a fixed moment of the machining engagement and can thus be assigned to a defined axial position of the tool zero point. It can be seen in the indicated position of the tool zero point that (in the case of axial feeding in FIG. 1 from top to bottom) the production of the flank geometry of the left flank LF is more advanced than that of the right flank RF. If the horizontal line passing through the tool zero point is considered to be the axial end E of the toothing, the left flank would already be finished in the illustrated position, but the machining of the right flank would not yet be finished in the region between the contact line and the axial toothing end E. The double arrow shown on the right in FIG. 1 indicates which additional axial relative movement would have to be performed by the tool and the toothing so that machining of the right flank is also finished. This axial distance is the overtravel path which is covered by further axial feeding in conventional machining to the end of a particular machining pass until the toothing machining has also been completed on the right flank.

Figure 2:
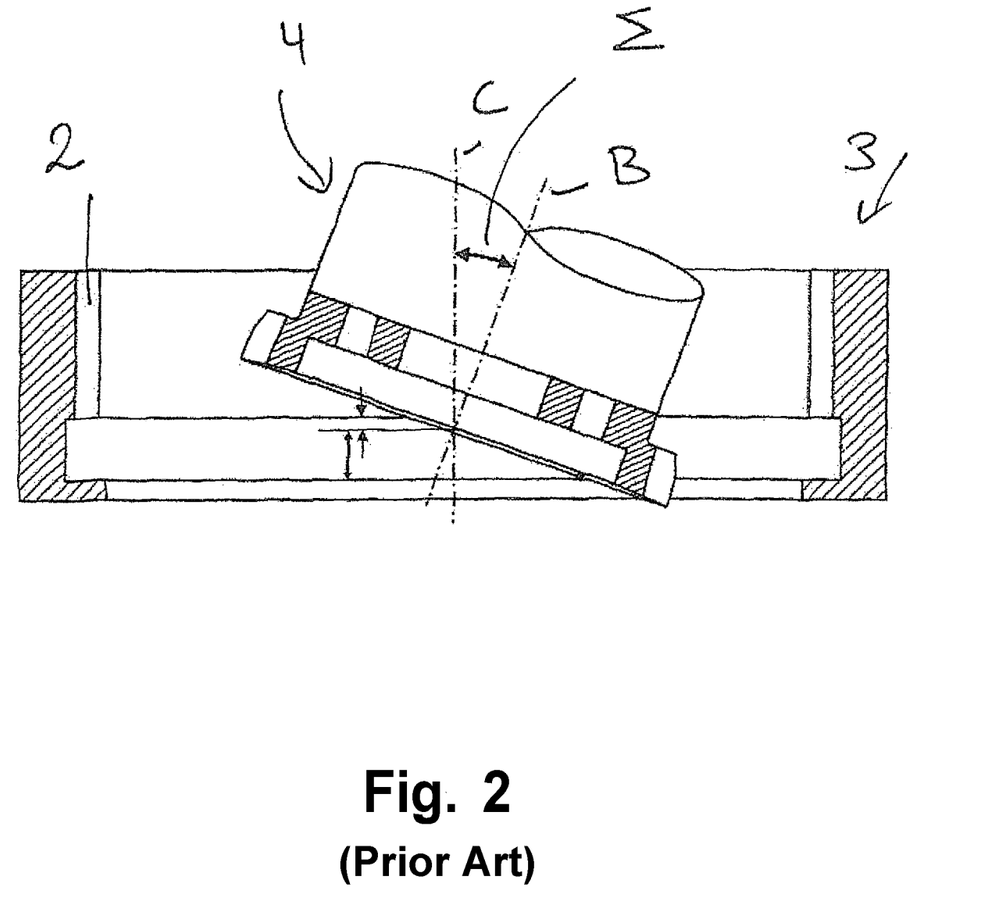
FIG. 2 shows a skiving wheel that machines a toothing.

FIG. 2 schematically shows a skiving wheel 4 and an internal toothing 2 produced by means of the skiving wheel 4. The viewing direction in FIG. 2 is that of a radial (advancement) axis. It can be seen that the axis of rotation B of the skiving wheel is inclined with respect to the axis of rotation C of the toothing by an axis intersection angle $\Sigma$. The position shown in FIG. 2 corresponds to that in which the machining of toothing is completed using conventional skiving, and the tool zero point is below the axial end of the toothing, and is spaced apart axially therefrom by the overtravel S.

The workpiece 3 shown which supports the toothing 2 has yet another contour axially below the toothing end, which contour is referred to in the following as an interfering contour. The double-sided arrow drawn in FIG. 2 indicates the distance ZS from the tool center in the axial direction, which must be maintained so that there can be machining without interference, despite the interfering contour.

FIG. 3a-d show, in a section orthogonal to the toothing axis, a tooth gap contour and also profiling cuts of the cutting movement of the skiving wheel, which are used in one embodiment of the invention in the second machining process, in which the axial feeding in the position of the tool zero point shown in FIG. 1 is stopped, and the machining tool plunges radially out of the tooth gap of the toothing such that single-flank cuts are made.

FIG. 4a-d show, synchronously to the view in FIG. 3a-d, how the profile of the toothing changes in the second machining process. The region above the diagonal contact line $K_a$, $K_b$, $K_c$ which can be seen in FIG. 4a-c indicates the flank region which has already been finished according to the desired flank geometry, and the region below is the region which still has an oversize relative to the desired flank geometry. Illustration a) in FIG. 4 for example shows the oversize situation below the contact line, which matches the situation from FIG. 1. In this view, which corresponds to the transition from the first to the second machining process, there is still a full radial advancement depth of the first machining process, as can be seen from illustration a) of FIG. 3.

Figure 3:
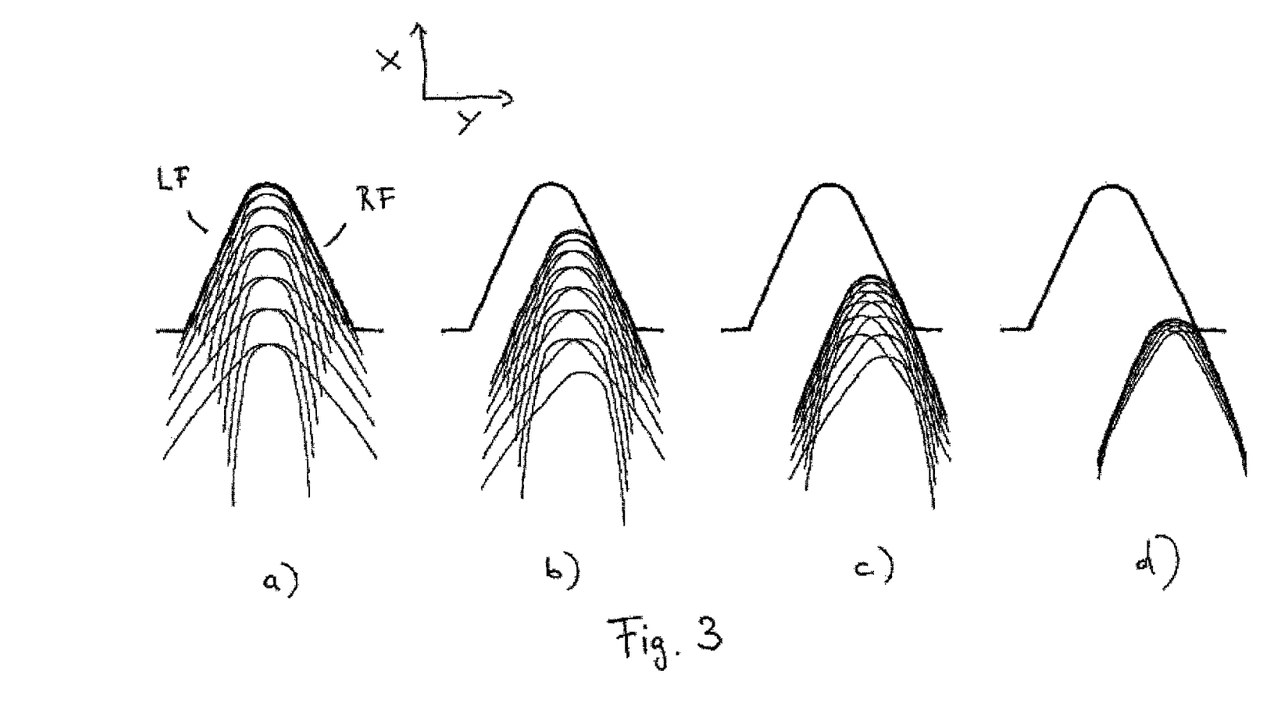
FIG. 3 shows profiling cut sequences during skiving.
Figure 4:
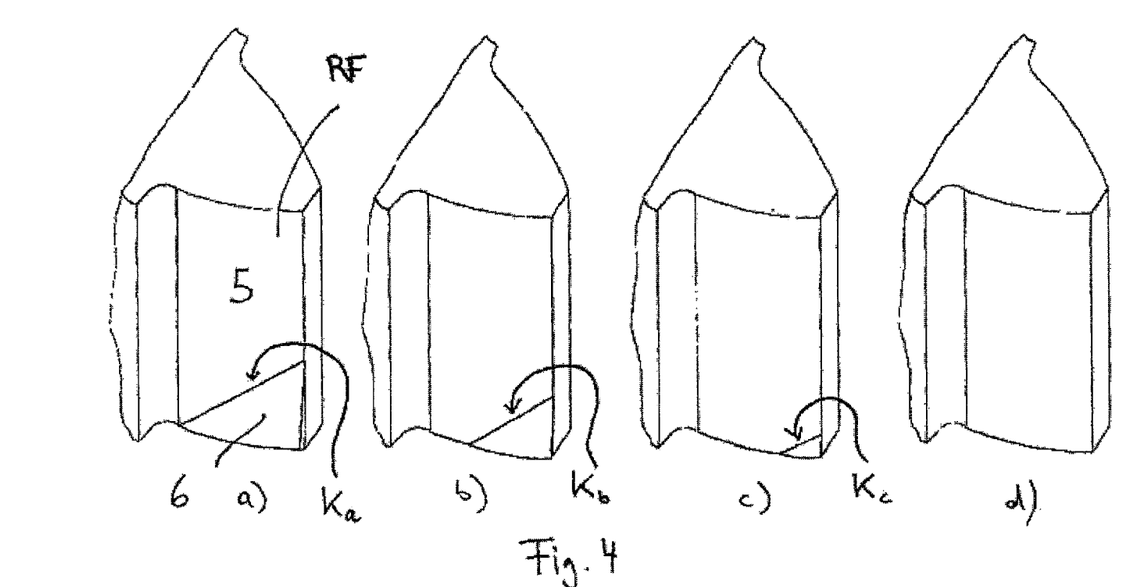
FIG. 4 shows a sequence of tooth flank views which matches that of FIG. 3.

In the machining example shown, there is now a radial plunging movement, as can be seen from the relative displacement of the envelopes in the radial axial direction X from illustration a) to the left to illustration d) to the right in FIG. 3. Furthermore, however, it can also be seen that the position of the envelopes changes with respect to the position of the tooth gap in the tangential direction Y due to a correspondingly configured additional movement. The superposition of the radial plunging movement and the additional movement is coordinated such that the envelope is moved along the flank geometry to be produced, and the tooth flank is thus finished, without the need for further axial feeding. The feeding in the second machining process is thus radial/tangential feeding in this embodiment. Without the tangential additional movement, an oversize and thus a considerable deviation from the desired flank geometry would remain.

In this way, the overtravel path which can be seen in FIG. 2 can in particular be completely omitted, as a result of which axial clearance with respect to a required axial distance ZS is achieved in order to avoid a collision with an interfering contour. Preferably, this axial clearance is created to a maximum, and a correspondingly reduced clearance is maintained if an axial feed movement is still carried out, but at a lower rate, and the radial plunging movement thus begins at an earlier axial position than is conventional. In other words, machining as outlined in FIGS. 3 and 4 can also be achieved if, during the second machining process, there is still (a smaller degree of) axial feeding. The toothing depth is maintained up to the axial toothing end E.

The portions of the overtravel movement, relating to the tangential axis Y, which are used to achieve the profiling cut progressions shown in FIG. 3b-c with respect to the toothing, can be achieved in many ways. On the one hand, this could be achieved by an additional rotation ΔC of the axis of rotation of the toothing, but also by an additional rotation ΔB about the axis of rotation of the tool, or a superposition of these. However, a tangential machine axis Y could also be changed compared with the first machining process. Optionally, this may also involve a change in the axis intersection angle Σ.

The preferred variant, however, lies in a superimposition of radial feeding, which ensures a continuously changed radial feeding compared with the first machining process, with an additional rotation in particular of the axis of rotation C of the toothing.

In particular when machining external toothings, it is also conceivable for a tangential plunging movement via machine axis Y to be realized, and in turn to use an additional rotation of the axis of rotation (B) of the toothing and/or the axis of rotation (C) of the toothing as an additional counteracting movement axis for producing the flank geometry.

Figure 5:
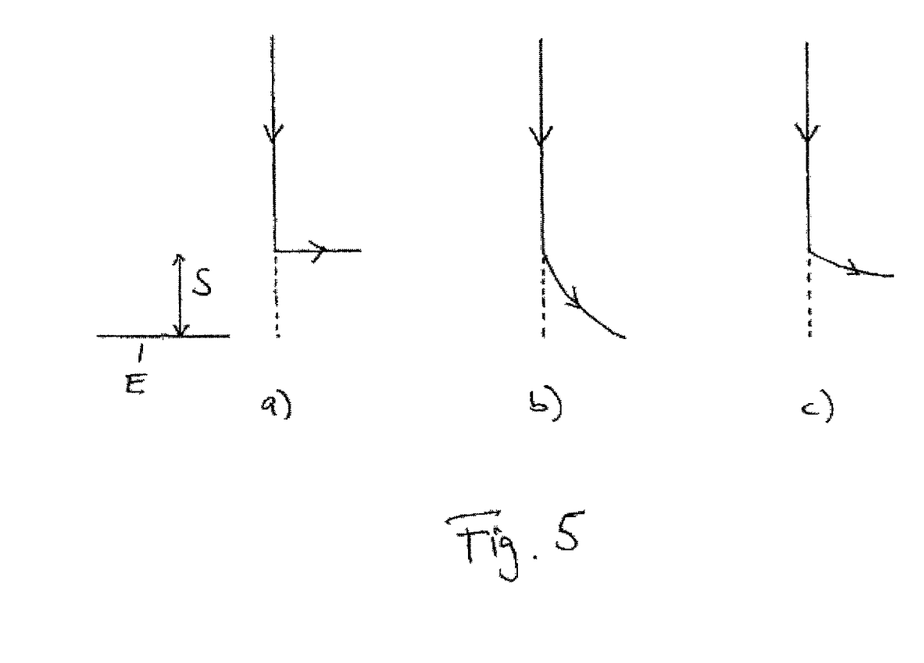
FIG. 5 shows path deviations in various embodiments.

FIG. 5 shows further examples of the change in the movement path of the tool center with respect to the movement path of the first machining process when it is assumed that the machining according to the movement control of the first machining process is continued. FIG. 5a corresponds to the preferred embodiment of a plunging movement without further axial feeding. On the other hand, the embodiment of FIG. 5b shows a variant in which axial feeding is maintained, but this is superimposed by a radial plunging movement. This variant can be used, for example, if the interfering contour only has a radial extent insofar as the danger of collision is substantially present only if the tool is still advanced with its full radial depth after passing through the overtravel. FIG. 5c shows another variation which does have an overtravel, but this is reduced.

The clearance obtained by saving on the overtravel can be used in several ways. On the one hand, a larger axis intersection angle Σ can be used to machine a workpiece having an interfering contour, and the tool can be designed for the larger axis intersection angle. A conventional machining process using a tool designed in this way would then, when machining the workpiece over the full axial width with the movement axis control of the first machining process, mean either that a safety distance from the interfering edge is no longer maintained, or that this would already lead to a collision with the interfering contour, but this is actually avoided by the transition to the second machining process according to the invention. Due to the larger axis intersection angle, the cutting speed increases and reduced machining times can be achieved.

Another possibility is to use the clearance not to change the tool design or for larger axis intersection angles and cutting speeds, but rather to use it to machine workpieces which have a small axial distance between the axial toothing end and the interfering contour in the skiving process, and which otherwise could not be machined by skiving, but only by generating-shaping.

Figure 6:
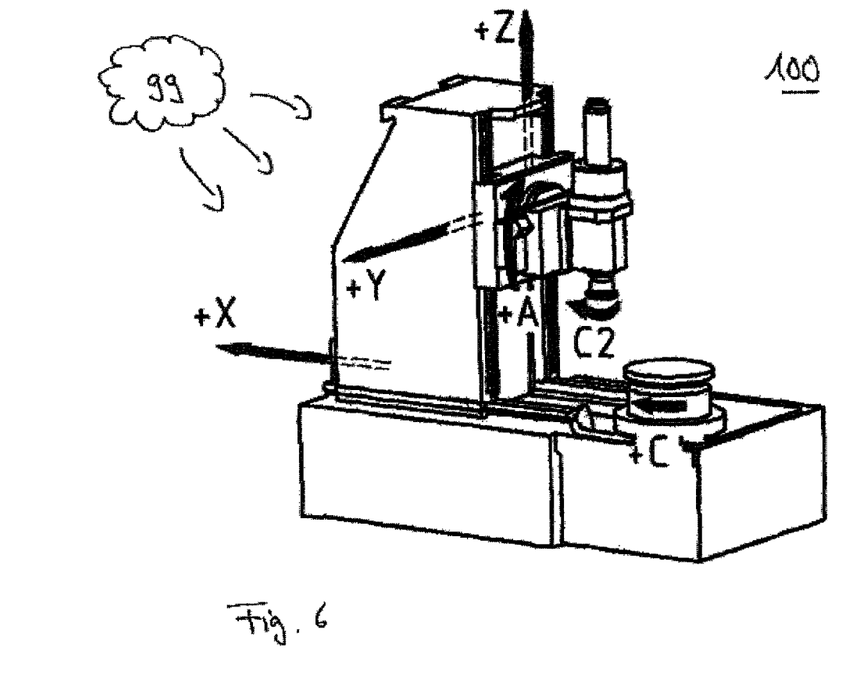
FIG. 6 shows a skiving machine.

FIG. 6 shows a skiving machine 100 with a schematically indicated controller 99. The machine axes X (radial), Y (tangential), Z (axial), A (pivot axis for setting axis intersection angle Σ), C2 (axis of rotation of the tool) and C (axis of rotation of the workpiece) allow the required relative movements, so that the control device 99 can control the skiving machine 100 in order to carry out the above-described method. The tool head arranged on the tangential slide (for Y) is pivotally mounted on a cross-slide assembly (for X and Z) by means of tangential slides. FIG. 6 is simply an example of a suitable machine; other configurations are possible, e.g. suspended spindles, pick-up systems, etc.

The invention is not limited to the specifications given in the examples provided above. Rather, for the invention, the features of the following claims as well as the above description may be essential for implementing the invention in its different embodiments.

The invention claimed is:

1. A method for machining a toothing (2) having a right tooth flank and a left tooth flank and an axis of rotation (C), in which a machining tool (4) having an axis of rotation (B) and a tool center (N) is driven in rotation about said axis of rotation (B) to remove material from the toothing, in a machining engagement, while performing relative movement between the machining tool and the toothing in order to produce a flank geometry on the right and left tooth flanks of the toothing that is predefined over a full width of the toothing, said method comprising:
 a first machining process, said first machining process comprising carrying out a first relative movement between the machining tool and the toothing in a first machining engagement for producing said predefined flank geometry completely along said full width on one of said right flank and said left flank and along a portion (5) of said full width on the other of said right flank and said left flank of said toothing according to a first controlled movement of the machining tool and the toothing on a machine tool having a controller, said first controlled movement defining a first movement path of the tool center with respect to the axis of rotation of the toothing, said first movement path having a defined axial feeding in the direction of the toothing axis of rotation and a defined axial advancement between the machining tool and the toothing in the direction of the toothing axis of rotation, and a second machining process wherein said predefined flank geometry is produced along a further portion of said full width on said other of said right flank and said left flank, said second machining process comprising carrying out a second relative movement between the machining tool and the toothing in a second machining engagement according to a second controlled movement of the machining tool and the toothing on said machine tool having said controller, the second controlled movement defining a second movement path of the machining tool with respect to the axis of rotation of the toothing by (1) changing the distance of the tool center from the axis of rotation of the toothing relative to said first movement path so as to move the tool center away from the toothing and (2) carrying out a counteracting compensating correction movement to bring said machining tool into machining engagement with said further portion of said full width on said toothing thereby resulting in changing the first machining engagement to the second machining engagement, to produce said predefined flank geometry along said further portion of said full width, wherein said first machining process and said second machining process are part of the same machining pass.

2. Method according to claim 1 wherein the toothing and the machining tool are in rolling engagement with one another during the first and second relative movements between the machining tool and the toothing.

3. Method according to claim 1 wherein the axes of rotation of the toothing and the machining tool are arranged at an axis intersection angle ($\Sigma$) that is not zero.

4. Method according to claim 3 wherein the axis intersection angle in the first and/or second machining process is at least 8°.

5. Method according to claim 1 wherein the machining tool is a tool having a geometrically determined cutting edge.

6. The method of claim 5 wherein said machining tool comprises a skiving wheel.

7. Method according to claim 1 wherein the second machining process further includes axial feeding in the direction of the toothing axis of rotation and wherein an extent of said axial feeding is reduced to less than 70% compared to an extent of the axial feeding of the first machining process.

8. Method according to claim 1 wherein the toothing part is part of a workpiece (3) having a further structure which, with respect to the toothing axis of rotation, has a radial extension at an axial distance from one of the axial toothing ends.

9. The method of claim 1 wherein the second machining process does not include movement of the machining tool in the direction of the toothing axis of rotation.

* * * * *